Figure 1:
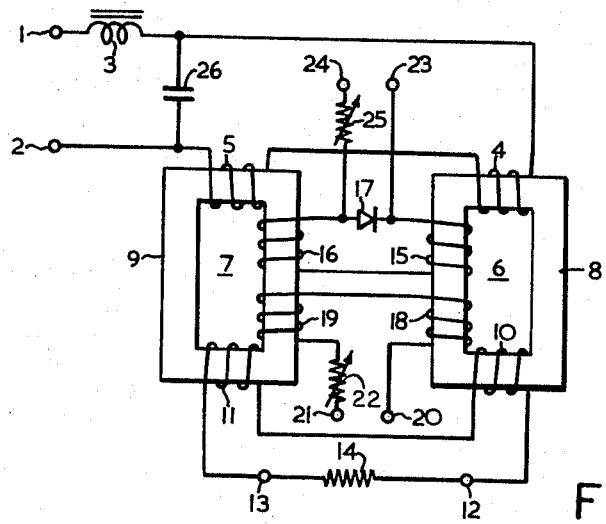

April 18, 1967 F. A. WENTWORTH 3,315,151
REGULATED TRANSFORMER POWER SUPPLIES
Filed Jan. 25, 1966 2 Sheets-Sheet 1

April 18, 1967   F. A. WENTWORTH   3,315,151
REGULATED TRANSFORMER POWER SUPPLIES
Filed Jan. 25, 1966                    2 Sheets-Sheet 2

Fitzwilliam Allan Wentworth
Inventor
By Wenderoth, Lind & Ponack
Attorney

United States Patent Office 3,315,151
Patented Apr. 18, 1967

3,315,151
REGULATED TRANSFORMER POWER SUPPLIES
Fitzwilliam Allan Wentworth, Mosman, New South Wales, Australia, assignor to Stabilac Pty. Limited, Kingsgrove, New South Wales, Australia, a corporation of New South Wales
Filed Jan. 25, 1966, Ser. No. 522,987
Claims priority, application Australia, Oct. 24, 1961, 10,582/61
4 Claims. (Cl. 323—56)

This invention relates to electrical power supplies having inherent constant voltage characteristics. The voltage output may be varied by a manual control, or automatically to provide a voltage regulated output which follows a desired law. This application is a continuation-in-part of application Serial No. 230,441 by Fitzwilliam Allan Wentworth filed October 15, 1962, and now U.S. Patent 3,253,212.

Until recently all commercially available voltage stabilizers and regulators using magnetic amplifier elements used elements basically designed for load current control, and suffered from certain disadvantages inherent in their design. These disadvantages, which are shared by most so-called electronic types of voltage stabilizers or regulators which use electronic amplifiers in a closed feedback loop and a saturable reactor as the power controlling element, are (1) Sudden line voltage changes or load changes cause relatively large fluctuations of the output voltage;
(2) the relatively slow response time of the saturable reactor limits the speed at which these fluctuations are corrected;
(3) line voltage transients are accentuated;
(4) special means must be adopted to allow control for light loads or open circuits; and
(5) certain component failures in the closed feedback loop causing a loss of control result in very high overvoltage at the output.

More recently new types of voltage stabilizers and regulators have become available which have made use of magnetic amplifier circuitry designed to have inherent constant voltage characteristics. These new types have greatly improved performance which eliminates most of the disadvantages listed as applying to previous circuitry. However they themselves have unfavourable characteristics in that expensive core materials are essential, at least two rectifiers are used which must handle a current considerably higher than the load current, and output voltage for the uncontrolled condition is low so that an open loop control system requires a source of bias to shift the operating point through the full control range. Also an extra transformer must be used if it is desired to electrically isolate input and output circuits or to provide voltage transformation (as for a D.C. supply), or alternatively extra commutating rectifiers are necessary when an A.C. output voltage is required.

The present invention enables a voltage regulator or stabilizer to be made in which, for single phase operation (1) inexpensive core materials are satisfactory: the use of low cost silicon steel laminations provides very high control sensitivity and linearity is adequate for voltage stabilizers with a reasonable adjustment range.
(2) The arrangement may be designed simultaneously as a transformer providing electrical isolation betweeen input and output circuits and any voltage ratio required if this is desired.
(3) Only one rectifier is required and it handles feedback power only.
(4) The control requirements are flexible and current control may be effected by D.C., A.C., halfwave A.C., fullwave rectifier A.C. or a combination of any of these:

Alternatively control may be achieved by a voltage in series with the feedback rectifier, or by the use of a controlled silicon rectifier for this component.

(5) The size of the regulating element for a given permissible temperature rise is approximately 30% smaller than that of the equivalent component of the prior art regulators using shunt connected magnetic elements.
(6) Output voltage for the uncontrolled state is high which simplifies design of open loop systems provided with compensating circuits.

This invention uses as a regulating element iron-cored saturable transformers having even-harmonic feedback, the load being coupled to a secondary on the transformer.

The object of this invention is to provide an electrical power supply achieving the above objectives.

Reference will now be made to the accompanying drawings in which

Figure 2:
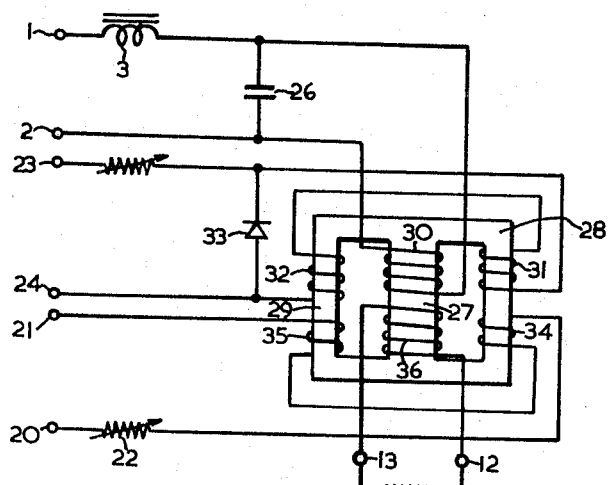
Figure 3:
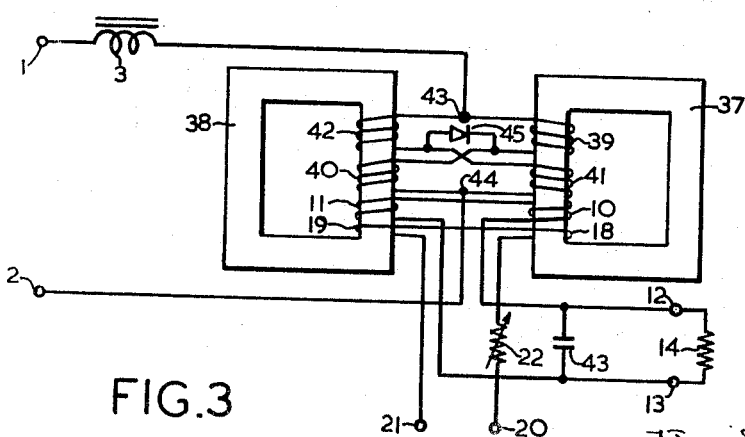
Figure 4:
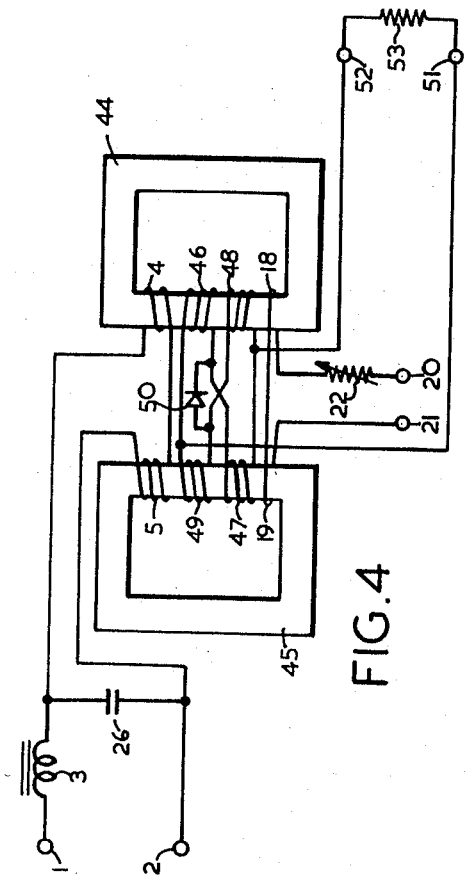
Figure 5:
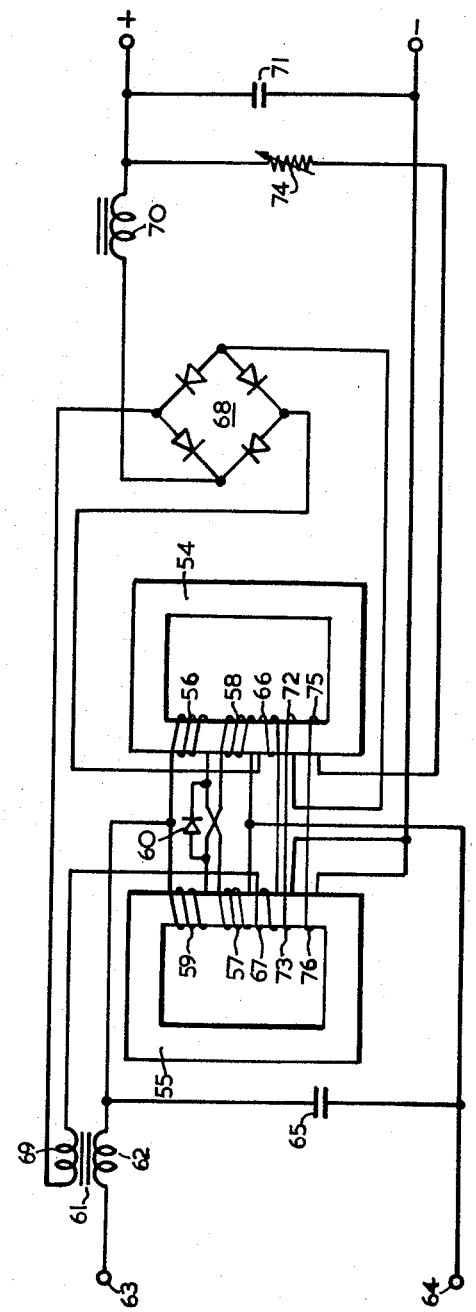

FIGURE 1 is a circuit diagram of a variable voltage A.C. power supply in accordance with this invention;
FIGURE 2 is a circuit diagram of a modification of the circuit of FIGURE 1;
FIGURE 3 is a circuit diagram of a further modification;
FIGURE 4 is a circuit diagram of a still further modification, and
FIGURE 5 is a circuit diagram of an A.C. to D.C. converter according to this invention giving a regulated D.C. output.

FIGURE 1 shows a variable voltage power supply adapted to provide an A.C. output which output is isolated from the input. An A.C. power source is connected to input terminals 1, 2. A current limiting element, shown as a choke 3, is connected in series with the similar primary windings 4, 5 of two saturable transformers 6, 7 across the input terminals 1, 2. There are thus two magnetic circuits, one in the core 8 and the other in the core 9. The output is taken from the series connected secondaries 10, 11 which are connected to terminals 12, 13 which in turn are connected to the load 14.

Similar feedback windings 15, 16 are provided on each core 8, 9 and these are connected together in opposition with respect to voltages of fundamental frequency induced in them, a halfwave feedback rectifier 17 being included in the connection.

Each transformer 6, 7 also has a control winding 18, 19 respectively which are connected in opposition to terminals 20, 21 by way of a variable resistor 22. A D.C. current can be applied to the terminals 20, 21 for control purposes, the magnitude of the current being set by variable resistor 22. Alternatively A.C., half-wave or fullwave rectified A.C., or a combination of them, may be used for control purposes.

The feedback provided by feedback windings 15, 16 is even-harmonic, predominantly second harmonic, and it is found that the primary winding voltage/current characteristic obtained shows an approach to constant voltage conditions, that is, as the primary current increases the voltage across it rises rapidly at first and then tends toward a limiting value. The current limiting element 3 prevents excessive current flow when the transformer primary windings present a low impedance to the input source. When there is no control current through control winding 18, 19, that is for zero control, the feedback windings have no effect since the induced voltages of fundamental frequency, and of the odd order harmonics caused by core saturation, cancel, and no current flows through the feedback rectifier 17. The voltage/current characteristic is therefore that of the normal magnetising current, and the voltage at the secondary output 12, 13 is a maximum.

If a control current from a high impedance source is now passed through the control windings 18, 19 the small D.C. magnetic fields established in the cores 8, 9 will be in the same direction as the instantaneous A.C. flux in one core but will oppose the instantaneous A.C. flux in the other core. If the applied A.C. voltage is low the A.C. flux excursions will be confined to the linear part of the core characteristics and no current will flow in the feedback circuit. As the A.C. voltage applied to the primary windings 4, 5 rises the flux excursions are carried into the presaturated region of non-linear core characteristics, the difference of the instantaneous fluxes linking the two feedback windings 15, 16 is no longer zero, and a voltage of even order harmonic frequencies appears which causes a circulating current at such frequencies through the feedback rectifier 17. This circulating harmonic current is small because of its high effective driving point impedance. The high impedance nature of the source of these currents arises from the fact that though the main total flux is fixed by the primary voltages this flux divides in the two separate magnetic paths of the cores and may be readily unbalanced. The peak values of the unbalanced flux excursions in the two cores is nearly equal to the sum of the D.C. control flux and the superposed A.C. flux.

As the A.C. voltage applied to the primary windings is increased further the maximum excursions of the magnetic flux are carried eventually into the saturated region of the core characteristic. The freely unbalanced condition of the fluxes in the two cores is now constrained and the effective driving impedance of the circulating even harmonic current drops sharply. The D.C. current through the rectifier 17 increases in such a direction as to augment the D.C. control current, and the effect is regenerative, resulting in rapid saturation of the cores for further increases in applied voltage. As a consequence a set of characteristic curves is obtained for increasing control current which are similar in shape to that for zero control current but flatten off at increasingly lower voltages across the primary windings. The response is complete within one or two cycles of the supply frequency.

The numbers of turns on the primary windings is designed to be such that the supply voltage is rather higher than necessary to saturate the magnetic cores. Neglecting losses the primary current will then be the vector sum of the equivalent secondary load referred to the primary and a high magnetising current. The supply voltage will be shared by the voltage drop across the impedance of the linear current limiting element 3 and the effective impedance of the two primaries in series. The primary impedance, and the secondary voltage applied to the load, will be a function of the control current.

A control current may also be applied to the feedback windings 15, 16 by bringing out the connections to the rectifier 17 to terminals 23, 24 by way of a variable resistor 25. The polarity of the control current must be suitably chosen with regard to the rectifier polarity.

A substantial improvement in the control range, inherent constant voltage characteristics, efficient utilization of materials, and input power factor is obtained by operating the transformers as ferro-resonant devices. This is achieved by shunting the primary windings 4, 5 by the capacitor 26. The capacitor may appear across any electrically equivalent winding such as the secondary windings as in FIGURE 3, and the windings across which the capacitor appears may be connected as an autotransformer to step up the voltage across it, and thus reduce the size of the capacitor, both of which steps are well-known in the saturable reactor art.

As is well-known to those skilled in the art the core members may be varied in shape and size. A unitary structure may be used for the pair of cores 8, 9, and an example of such a construction in shown in FIGURE 2. The core has a central limb 27 and two outer limbs 28, 29 and provides two magnetic circuits, one consisting of the outer leg 28, half the central leg 27, and the members bridging them, and the other magnetic circuit consisting of the outer limb 29, the other half of the central leg 27, and the members bridging them. A primary winding 30 is placed upon the central limb 27 and is the electrical equivalent of the primary windings 4 and 5 of FIGURE 1. The primary winding 30 is connected in series with a current limiting element 3 across the A.C. mains source at 1, 2 as before, and is shunted by the capacitor 26. Feedback windings 31, 32 are provided on the outer limbs 28, 29 respectively and are connected in opposition as before by way of a feedback rectifier 33. Opposed control windings 34, 35 are also provided on the outer limbs and are connected to control terminals 20, 21 by way of the variable resistor 22. A single secondary winding 36 is electrically equivalent to the secondaries 10, 11 of FIGURE 1. Operation is the same as in the case of FIGURE 1.

FIGURE 3 shows another arrangement employing two separate cores 37, 38. As before the primary windings are connected in series with a current limiting choke 3 across the A.C. input terminals 1, 2. The primary windings provide two parallel paths for fundamental frequencies by employing four identical windings, two on each core, connected as follows. One winding 39 on one core 37 is connected in series with a winding 40 on core 38. The other winding 41 on the said one core 37 is connected in series with the second winding 42 on the other core 38. The free ends of the two pairs of windings are connected in parallel to the terminals 43, 44. A feedback rectifier 45 is connected between the junction of windings 39, 40 on the one hand and that of windings 41, 42 on the other hand. Although the primary windings provide parallel paths for fundamental A.C. components, they are in series for the rectified circulating even-harmonic current. The feedback rectifier 45 is connected to points on the sets of windings of equal potential with respect to the fundamental frequency component, but provides a path for rectified components of even-harmonic frequency to flow through the series arrangement of windings. Leakage reactance between separate primary and feedback windings is eliminated giving improved characteristics over those of FIGURES 1 and 2. Control windings 18, 19 are provided on each core as in the case of FIGURE 1. Ferro-resonant operation is achieved by means of the capacitor 43 connected across the secondary windings 10, 11.

The circuit arrangement of FIGURE 4 also employs two cores 44, 45. As in the case of FIGURE 1 two primary windings 4, 5 are provided, one on each core, and these are connected in the same way as in FIGURE 1. Similarly there are opposed control windings 18, 19 connected to terminals 20, 21 by way of a variable resistor 22. The secondary consists of four identical windings, two on each core. The first winding 46 on one core 44 is connected in series with a winding 47 on the second core 45. The second winding 48 on the said one core is connected in series with the winding 49 on the second core. The free ends of windings 46, 49 are connected to each other and to terminal 51, and the free ends of windings 47, 48 are connected to each other and to terminal 52. The load is shown at 53. The windings 46, 47 on the one hand and 48, 49 on the other hand provide parallel paths for the fundamental A.C. components, but are in series for circulating even-harmonic currents. The feedback rectifier 50 is connected to the junction of 46, 47 and 48, 49.

FIGURE 5 is a circuit diagram of a regulated D.C. power supply based on the circuit of FIGURE 3. Two magnetic cores 54, 55 are provided. The primary windings 56, 57, 58, 59 are similar to the primary windings 39, 40, 41, 42 of FIGURE 3. An even-harmonic feedback rectifier 60 is provided. The equivalent primary is connected in series with a current limiting element shown in this case as a double wound choke 61, the primary being in series with the primary 62 of the choke across the A.C. input 63, 64. A capacitor 65 is connected across the primaries of the saturable transformers to provide ferro-resonant operation. Secondaries 66, 67 on the cores 54, 55 respectively are connected in series and to a bridge rectifier 68 by way of a secondary winding 69 on the choke 61. The rectified output is smoothed by choke 70 and capacitor 71. The output current is taken through a first pair of control windings 72, 73. A bleed current across the rectified output is provided by resistor 74 and this bleed current is taken through a second pair of control windings 75, 76. The bleed current through the control windings 75, 76 reduces the output voltage from the power supply under no-load conditions. As the load draws current the load current through control windings 72, 73 opposes the effect of the bleed current, and the output voltage tends to remain constant.

What I claim is:

1. An electrical power supply comprising input terminals for connection to an alternating current source, a current limiting element, a pair of saturable transformer cores, a primary winding on each transformer core, means for coupling said primary windings and current limiting element in series across said input terminals, a secondary winding on each transformer core, output terminals for connection to a load, means for coupling said secondary windings in series to said output terminals, control windings on said saturable transformer cores, and means on said saturable transformer cores and including a feedback rectifier for providing even-harmonic feedback in said saturable transformer cores.

2. An electric power supply as claimed in claim 1 in which said means for providing even-harmonic feedback comprises a feedback winding on each saturable transformer core and connections between said feedback windings and said feedback rectifier, whereby said feedback windings oppose voltages of fundamental frequency induced in them.

3. An electrical power supply comprising input terminals for connection to an alternating current source, a current limiting element, a pair of saturable transformer cores, a primary winding on each transformer core, means for coupling said primary windings and current limiting element in series across said input terminals, a secondary winding on each transformer core, output terminals for connection to a load, means for coupling said secondary windings in series to said output terminals, control windings on said saturable transformer cores, and means for providing even-harmonic feedback in said saturable transformer cores and comprising a feedback rectifier and connections between said feedback rectifier and points on said primary windings which are at equal potentials for fundamental frequencies, said primary windings being connected in series for rectified even-harmonic frequencies.

4. An electrical power supply comprising input terminals for connection to an alternating current source, a current limiting element, a pair of saturable transformer cores, a primary winding on each transformer core, means for coupling said primary windings and current limiting element in series across said input terminals, a secondary winding on each transformer core, output terminals for connection to a load, means for coupling said secondary windings in series to said output terminals, control windings on said saturable transformer cores, and means for providing even-harmonic feedback in said saturable transformer cores and comprising a feedback rectifier and connections between said feedback rectifier and points on said secondary windings which are at equal potentials for fundamental frequencies, said secondary windings being connected in series for rectified even-harmonic frequencies.

References Cited by the Examiner

UNITED STATES PATENTS

| 2,678,419 | 5/1954 | Bennett | 323—56 |
| 3,037,160 | 5/1962 | Manteuffel | 323—56 |
| 3,112,440 | 11/1963 | Moyer | 323—56 |

JOHN F. COUCH, *Primary Examiner.*

W. E. RAY, W. M. SHOOP, *Assistant Examiners.*